United States Patent [19]
Bito et al.

[11] Patent Number: 5,580,538
[45] Date of Patent: Dec. 3, 1996

[54] PROCESS FOR PRODUCING A NEGATIVE ELECTRODE FOR A STORAGE BATTERY WITH A NON-AQUEOUS ELECTROLYTE

[75] Inventors: Yasuhiko Bito, Yao; Shuji Ito, Kadoma; Hiroyuki Murai; Masaki Hasegawa, both of Hirakata; Yoshinori Toyoguchi, Yao, all of Japan

[73] Assignee: Matsushita Electric Industrial Co., Ltd., Osaka, Japan

[21] Appl. No.: 306,248

[22] Filed: Sep. 14, 1994

Related U.S. Application Data

[63] Continuation of Ser. No. 31,627, Mar. 15, 1993, abandoned.

[30] Foreign Application Priority Data

Mar. 18, 1992 [JP] Japan ..................... 4-061661
Mar. 18, 1992 [JP] Japan ..................... 4-061665

[51] Int. Cl.$^6$ ..................................... D01F 9/12
[52] U.S. Cl. ............... 423/447.4; 423/448; 423/445 R; 264/105
[58] Field of Search .................. 429/218; 252/502, 252/503; 264/105; 423/448, 445 R, 447.4

[56] References Cited

U.S. PATENT DOCUMENTS 5,028,500  7/1991  Fong et al. ................. 429/218
5,153,082 10/1992  Ogino et al. ............... 429/218
5,158,578 10/1992  Yoshimoto et al. ......... 429/218

FOREIGN PATENT DOCUMENTS 0418514  3/1991  European Pat. Off. .
0529095  3/1993  European Pat. Off. .
3245458 11/1991  Japan .

OTHER PUBLICATIONS

European Search Report of Appl. 93104339.2 mailed Jun. 10, 1993.

Primary Examiner—Kathryn Gorgos
Attorney, Agent, or Firm—Renner, Otto, Boisselle & Sklar, P.L.L.

[57] ABSTRACT

A process of making a negative electrode for a storage battery including a positive electrode capable of being reversibly charged and discharged, a nonaqueous electrolyte containing lithium salt, and a negative electrode is provided. The negative electrode is made of an inorganic carbon material which has an improved surface having a specific surface area sufficiently large enough to store the largest possible amount of lithium ions therein to provide the largest possible charge and discharge capacitances for the storage battery. The electrode is made by adding an acid to an inorganic carbon containing material to form a mixture, heating the mixture for at least 10 hours to obtain a carbon material having a specific surface area of more than 8.0 m$^2$/g and forming the electrode using the carbon material.

6 Claims, 2 Drawing Sheets

5,580,538

PROCESS FOR PRODUCING A NEGATIVE ELECTRODE FOR A STORAGE BATTERY WITH A NON-AQUEOUS ELECTROLYTE

This is a continuation of application Ser. No. 08/031,627 filed on Mar. 15, 1993, now abandoned.

BACKGROUND OF THE INVENTION

1. Field of the Invention

The present invention relates to a negative electrode made of carbon material used for a storage battery including a positive electrode capable of being reversibly charged and discharged and a nonaqueous electrolyte containing lithium salt. More particularly, the present invention relates to a negative electrode for a storage battery having high reliability without the formation of a dendrite. The present invention further relates to a process for producing such a negative electrode.

2. Description of the Related Art

A storage battery with a nonaqueous electrolyte using lithium (Li) as a negative electrode has a high electromotive force. The energy density thereof is, therefore, higher than that of a conventional nickel-cadmium battery or a lead battery.

However, in such a storage battery using metallic Li as a negative electrode, when the battery is charged, the Li metal is deposited on the surface of the negative electrode, forming a dendrite. The dendrite formation often causes a short-circuit within the battery.

In order to prevent the deposition of Li metal at charging, there has been studied using an alloy of Li and aluminum (Al) or Li and lead (Pb), or an intercalation compound of inorganic carbon (C) such as graphite and Li as a negative electrode active material.

As for using the alloy as the negative electrode, since Li can be stored in the alloy at charging, there is no dendrite formation. Thus, a battery with high reliability can be obtained. However, the discharge potential of the negative electrode made of the alloy is higher than that of the electrode made of Li metal by approximately 0.5 V. This means that when the alloy is used as the negative electrode, the discharge voltage of the resultant battery decreases by approximately 0.5 V, and thus the energy density of the battery lowers, compared with when unalloyed Li metal is used.

As for using an intercalation compound of inorganic carbon such as graphite and Li as the negative electrode active material, Li can be stored between layers of carbon at charging. Thus, there is no dendrite formation. Further, the increment of the discharge potential of such a negative electrode from that of the electrode made of Li metal is only approximately 0.1 V. Accordingly, the decrease of the discharge voltage of the resultant battery can be reduced.

The intercalation compound of carbon material such as graphite and Li is represented by $C_6Li$, which means that stoichiometrically Li equivalent to one-sixth of the carbon can be stored in the compound at charging. The theoretical capacitance at this time is 372 Ah/kg. However, when the intercalation compound is actually applied to the battery, the capacitance at charging and discharging is only approximately 230 Ah/kg.

SUMMARY OF THE INVENTION

According to the present invention, a negative electrode for a storage battery including a positive electrode capable of being reversibly charged and discharged, a nonaqueous electrolyte containing lithium salt, and a negative electrode is provided. The negative electrode is made of a carbon material which has an improved surface having a specific surface area sufficiently large enough to store the largest possible amount of lithium ions therein to provide the largest possible charge and discharge capacitances for the storage battery.

In another aspect of the present invention, a process is shown for producing a negative electrode for a storage battery including a positive electrode capable of being reversibly charged and discharged, a nonaqueous electrolyte containing lithium salt, and a negative electrode. The process includes the steps of adding an acid to a carbon-containing material to form a mixture, heating the mixture at a predetermined heating temperature to obtain a carbon material, and forming the negative electrode by use of the carbon material.

Thus, the invention described herein makes possible the advantage of providing a negative electrode formed of carbon material with increased charge and discharge capacitances so as to provide a storage battery having high energy density and high reliability without danger of a short-circuit due to the dendrite formation.

This and other advantages of the present invention will become apparent to those skilled in the art upon reading and understanding the following detailed description with reference to the accompanying figures.

DESCRIPTION OF THE PREFERRED EMBODIMENTS

Figure 1:
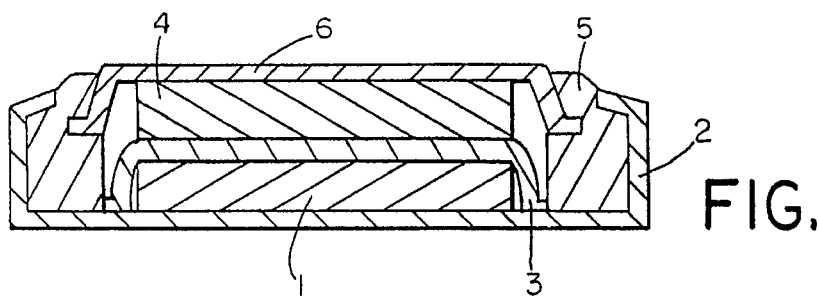
FIG. 1 is a schematic sectional view showing a test battery using a negative electrode according to the present invention for examining the properties of the electrode.

The carbon-containing material used for producing the negative electrode of the present invention can be an inorganic carbon material or an organic material. The inorganic carbon materials include pitch-based artificial graphite, natural graphite, carbon fiber, a graphite whisker, and the like. The organic materials include liquid materials such as pitch, coal tar, a mixture of coke and pitch, and the like; solid materials such as wooden material, phenol resin, epoxy resin, alkyd resin, furan resin, cellulose, polyacrylonitrile (PAN), rayon, and the like; and hydrocarbon gas such as methane and propane. The carbon material as used herein refers to a material containing inorganic carbon as a major ingredient obtained by converting the carbon-containing material into carbon or graphite by heating.

As for the acid added to the carbon-containing material, various kinds of acids including an inorganic acid and a carboxylic acid can be used. Preferably, at least one selected from the group consisting of sulfuric acid, nitric acid, hydrochloric acid, boric acid, acetic acid, and formic acid, most preferably sulfuric acid or nitric acid, can be used.

The carbon material which constitutes the negative electrode of the present invention is normally prepared by a process including the steps of adding the acid to the carbon-containing material and heating the resultant mixture. One to twenty parts by weight, preferably 1–10 parts by weight of the acid is added to 100 parts by weight of the carbon-containing material. The heating is normally performed in an inert atmosphere, for example in an argon atmosphere, at a sufficiently high temperature, preferably in the range of 100° C. to 1500° C. when the carbon-containing material is an inorganic carbon material, and in the range of 400° C. to 3000° C. when it is an organic material.

The negative electrode of the present invention may also include a binder, when required, for use in molding the carbon material into an appropriate shape as the electrode. Appropriate binders include resins such as polyethylene, polytetrafluoroethylene, and the like.

The negative electrode of the present invention can be applied to a storage battery including a positive electrode capable of being reversibly charged and discharged and a nonaqueous electrolyte containing lithium salt, and using carbon material as a negative electrode The positive electrode capable of being reversibly charged and discharged may be formed of $LiMn_2O_4$, $LiCoO_2$, $LiNiO_2$, or the like.

The nonaqueous electrolyte containing Li salt can be a normally available nonaqueous electrolyte. For example, a liquid mixture of ethylene carbonate (EC) and dimethoxyethane (DME) with lithium perchlorate ($LiClO_4$) or lithium trifluoromethanesulfonate ($LiCF_3SO_3$) dissolved therein is preferably used.

The negative electrode of the present invention can be molded into various shapes such as a coin shape, a cylindrical shape, and a flattened shape by pressing depending on the shape of the battery to which the negative electrode is applied.

Thus, according to the negative electrode of the present invention, since the carbon material for the negative electrode has a sufficiently large specific surface area, and that the capacitance thereof is as large as that of a conventional negative electrode made of an intercalation compound, Li molecules are easily absorbed into the carbon material at charging, and those stored in the carbon material are easily released into the electrolyte as ions at discharging. Accordingly, there is no dendrite formation caused by the deposition of Li metal on the surface of the negative electrode at charging. As a result, any problem with short-circuiting in the battery can be avoided. Further, the increment of the discharge potential of the negative electrode of the present invention from that of the electrode made of Li metal is only approximately 0.1 V. Accordingly, the decrease of the voltage of the resultant battery can be reduced. Moreover, the difference between the charge capacitance and the discharge capacitance, i.e., the amount of Li which was absorbed into the carbon material at charging but has not been released therefrom at discharging in the initial cycle can be reduced, compared with a conventional battery. Thus, an electrochemically active state where Li ions can be more easily absorbed after the discharge of the negative electrode can be obtained.

EXAMPLES

The present invention will be described by way of examples with reference to the attached drawings.

Example 1

A process for preparing carbon material containing boric acid will be described.

Two parts by weight of a boric acid ($H_3BO_3$) solution containing 5% by weight of boric acid was added to 98 parts by weight of dried pitch-based artificial graphite, and sufficiently mixed in a mortar. The mixture was then heated in an argon atmosphere at 1500° C. for 10 hours to obtain a carbon material. Hereinafter, the carbon material obtained in this example is referred to as "ACID-C1".

In order to examine the properties of the thus-prepared carbon material as an electrode, a test battery as shown in FIG. 1 was manufactured in the following manner:

Ten grams of ACID-C1 was mixed with 1 g of polyethylene powder as a binder, and 1 g of the mixture was pressed to form a disk-shaped ACID-C1 electrode 1 having a diameter of 17.5 mm. The electrode 1 was placed in a case 2 and covered with a separator 3 made of microporous polypropylene. Then, a mixture of ethylene carbonate (EC) and dimethoxyethane (DME) at a volume ratio of 1:1 containing lithium perchlorate ($LiClO_4$) at 1 mol/liter was prepared as a nonaqueous electrolyte, and poured over the separator 3. Thereafter, a round Li metal sheet 4 having a diameter of 17.5 mm was attached to the separator 3, and then covered with a closing plate 6 provided with a polypropylene gasket 5 on the periphery thereof to close the case 2 and thus to complete the test battery.

The thus-manufactured test battery was cathodically polarized (charged when the ACID-C1 electrode is considered as a negative electrode) until the voltage of 0 V was obtained at the ACID-C1 electrode with regard to the Li counter electrode, and subsequently, anodically polarized (discharged) until the voltage of 1.0 V was obtained at the ACID-C1 electrode with regard to the Li electrode. This cycle of charging and discharging was repeated to measure the electrical properties of the ACID-C1 electrode.

As a comparative example, a control electrode (hereinafter referred to as a C electrode) was prepared in the same manner as the ACID-C1 electrode except that boric acid was not added to the pitch-based artificial graphite in this comparative example. Then, a test battery was manufactured using the C electrode in the manner as described above, and the test battery was subjected to repeated cycles of cathodic polarization and anodic polarization under the conditions as described above.

Figure 2:
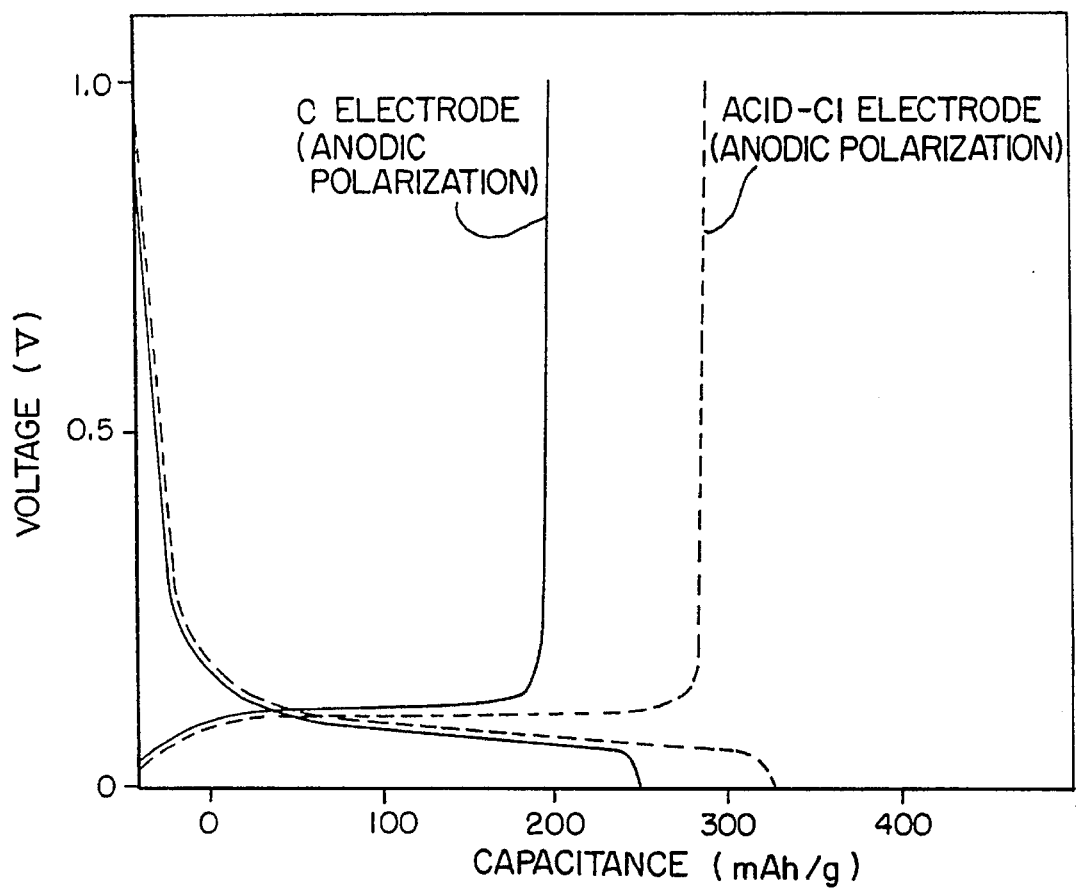
FIG. 2 shows charge and discharge curves of the test battery of FIG. 1 using the negative electrode according to the present invention.

FIG. 2 shows a cathodic polarization curve and an anodic polarization curve for each of the ACID-C1 electrode (shown by dashed lines) and the C electrode (shown by solid lines) at the eleventh cycle of charging and discharging. As shown in FIG. 2, though the voltages at each polarization for the ACID-C1 electrode and the C electrode are substantially the same, the capacitance for the ACID-C1 electrode of the present invention is greater than that for the C electrode.

The test batteries were disassembled after the completion of the cathodic polarization in the eleventh cycle. As a result, no deposition of Li metal was observed for either the ACID-C1 electrode or the C electrode, and Li was found stored in both electrodes by visual observation. This indicates that the Li had been absorbed into the ACID-C1 electrode during the cathodic polarization.

Example 2

A process for preparing carbon material containing sulfuric acid will be described.

Ten milliliters of 1.0N sulfuric acid were added to 100 g pitch-based artificial graphite, and sufficiently mixed in a mortar. The mixture was then heated in an argon atmosphere at 1500° C. for 10 hours to obtain a carbon material. Hereinafter, the carbon material obtained in this example is referred to as "ACID-C2".

In order to examine the properties of the thus-prepared carbon material as an electrode, a test battery as shown in FIG. 1 was manufactured in the manner as described in Example 1. The test battery was then subjected to repeated cycles of cathodic polarization and anodic polarization under the same conditions as in Example 1.

As a comparative example, the battery using the C electrode described in Example 1 was also used in this example.

Table 1 shows the charge capacitance and the discharge capacitance for each of the ACID-C2 electrode and the C electrode at the first cycle and the eleventh cycle of the cathodic polarization and the anodic polarization. The voltages of the two test batteries at each polarization were substantially the same.

TABLE 1

|  | First cycle | | Eleventh cycle | |
|---|---|---|---|---|
|  | Charge capacitance mAh/g | Discharge capacitance mAh/g | Charge capacitance mAh/g | Discharge capacitance mAh/g |
| ACID-C2 Electrode | 370 | 330 | 330 | 330 |
| C Electrode (Comparative example) | 300 | 260 | 260 | 260 |

As is seen from Table 1, both the charge capacitance and the discharge capacitances for the ACID-C2 electrode of this example are greater than those for the C electrode. Especially, the discharge capacitance is kept unchanged after eleven cycles, indicating that the battery using the ACID-C2 electrode of this example can retain a large discharge capacitance.

The test batteries were disassembled after the completion of the cathodic polarization in the eleventh cycle. As a result, no deposition of Li metal was observed for either the ACID-C2 electrode or the C electrode, and Li was found stored in both electrodes by visual observation. This indicates that the Li had been absorbed into the ACID-C2 electrode during the cathodic polarization.

Example 3

A process for preparing carbon material containing nitric acid will be described.

Ten milliliters of 1.0N nitric acid were added to 100 g pitch-based artificial graphite, and sufficiently mixed in a mortar. The mixture was then heated in an argon atmosphere at 1500° C. for 10 hours to obtain a carbon material. Hereinafter, the carbon material obtained in this example is referred to as "ACID-C3".

In order to examine the properties of the thus-prepared carbon material as an electrode, a test battery as shown in FIG. 1 was manufactured in the manner as described in Example 1. The test battery was then subjected to repeated cycles of cathodic polarization and anodic polarization under the same conditions as in Example 1.

As a comparative example, the battery using the C electrode described in Example 1 was also used in this example.

Table 2 shows the charge capacitance and the discharge capacitance for each of the ACID-C3 electrode and the C electrode at the first cycle and the eleventh cycle of the cathodic polarization and the anodic polarization. The voltages of the two test batteries at each polarization were substantially the same.

TABLE 2

|  | First cycle | | Eleventh cycle | |
|---|---|---|---|---|
|  | Charge capacitance mAh/g | Discharge capacitance mAh/g | Charge capacitance mAh/g | Discharge capacitance mAh/g |
| ACID-C3 Electrode | 360 | 320 | 320 | 320 |
| C Electrode (Comparative example) | 300 | 260 | 260 | 260 |

As is seen from Table 2, both the charge and discharge capacitances for the ACID-C3 electrode of this example are greater than those for the C electrode. Especially, the discharge capacitance is kept unchanged after eleven cycles, indicating that the battery using the ACID-C3 electrode of this example can retain a large discharge capacitance.

The test batteries were disassembled after the completion of the cathodic polarization in the eleventh cycle. As a result, no deposition of Li metal was observed for either the ACID-C3 electrode or the C electrode, and Li was found stored in both electrodes by visual observation. This indicates that the Li had been absorbed into the ACID-C3 electrode during the cathodic polarization.

Example 4

Sulfuric acid, nitric acid, hydrochloric acid, boric acid, and formic acid were respectively added to pitch-based artificial graphite to form negative electrodes. The resultant negative electrodes were tested to compare the capacitances and the properties thereof.

Ten milliliters of each of 1.0N sulfuric acid, nitric acid, hydrochloric acid, boric acid, and formic acid were added to 100 g pitch-based artificial graphite, and sufficiently mixed in a mortar. These five mixtures were then heated in an argon atmosphere at 1500° C. for 10 hours to obtain carbon materials.

In order to examine the properties of the thus-prepared carbon materials as an electrode, test batteries as shown in FIG. 1 were manufactured for respective carbon materials in the manner as described in Example 1. The test batteries were then subjected to repeated cycles of cathodic polarization and anodic polarization under the same conditions as in Example 1.

As a comparative example, the battery using the C electrode described in Example 1 was also used in this example.

Table 3 shows the charge capacitance and the discharge capacitance for each electrode at the first cycle of the cathodic polarization and the anodic polarization. The voltages of these test batteries at each polarization were substantially the same. Table 3 also shows a specific surface area for each carbon material. The specific surface area was measured by a nitrogen adsorption (BET) method after the electrode was degased and dehydrated under an evacuated condition at 200° C. for 10 hours.

TABLE 3

| Acid added | First cycle charge capacitance (mAh/g) | First cycle discharge capacitance (mAh/g) | Specific surface area (m²/g) |
|---|---|---|---|
| Sulfuric acid | 370 | 330 | 15.9 |

TABLE 3-continued

| Acid added | First cycle charge capacitance (mAh/g) | First cycle discharge capacitance (mAh/g) | Specific surface area (m²/g) |
| --- | --- | --- | --- |
| Nitric acid | 360 | 320 | 13.0 |
| Hydrochloric acid | 340 | 300 | 9.1 |
| Boric acid | 350 | 310 | 11.4 |
| Formic acid | 325 | 285 | 8.0 |
| No acid (comparative example) | 300 | 260 | 5.2 |

As is seen from Table 3, both the charge and discharge capacitances for each electrode obtained in this example are greater than those of the C electrode. Especially, those of electrodes obtained by adding sulfuric acid and nitric acid respectively are largest. Similar results were observed for the charge and discharge capacitances at the eleventh cycle though they are not shown.

When the electrodes obtained in this example were immersed in pure water, the pH of the resultant leaching solutions were all neutral.

It is also seen from Table 3 that the specific surface areas of all the electrodes obtained by adding acids are larger than that of the C electrode. Especially those of the electrodes obtained by adding sulfuric acid and nitric acid respectively are largest, indicating that the specific surface area is proportional to the charge and discharge capacitances.

Example 5

In this example, the temperature for heating the mixture of the pitch-based artificial graphite and the acid to obtain the carbon material was examined.

Ten milliliters of 1.0N sulfuric acid were added to 100 g pitch-based artificial graphite, and sufficiently mixed in a mortar. Eight identical samples of such a mixture were prepared and heated in an argon atmosphere at different temperatures of 80° C., 100° C., 300° C., 500° C., 1000° C., 1200° C., 1500° C., and 2000° C. for 10 hours.

In order to examine the properties of the thus-prepared carbon materials as an electrode, test batteries as shown in FIG. 1 were manufactured for respective carbon materials in the manner as described in Example 1. The test batteries were then subjected to repeated cycles of cathodic polarization and anodic polarization under the same conditions as in Example 1.

Table 4 shows the charge capacitance and the discharge capacitance for each electrode at the first cycle and the eleventh cycle of the cathodic polarization and the anodic polarization.

TABLE 4

| Heating temperature | First cycle | | Eleventh cycle | |
| --- | --- | --- | --- | --- |
| | Charge capacitance mAh/g | Discharge capacitance mAh/g | Charge capacitance mAh/g | Discharge capacitance mAh/g |
| 80° C. | 250 | 210 | 210 | 210 |
| 100° C. | 310 | 270 | 260 | 260 |
| 300° C. | 320 | 280 | 270 | 270 |
| 500° C. | 330 | 290 | 280 | 280 |
| 1000° C. | 340 | 300 | 300 | 300 |
| 1200° C. | 350 | 310 | 310 | 310 |
| 1500° C. | 370 | 330 | 330 | 330 |
| 2000° C. | 370 | 330 | 330 | 330 |

As is seen from Table 4, the charge capacitance at the first cycle exceeds 300 mAh/g when the heating temperature is 100° C. or more. Both the charge and discharge capacitances increase as the heating temperature increases in the range of 100° C. to 1500° C.

Example 6

In the following examples, an organic material is used as the carbon-containing material for preparing a carbon material, instead of the inorganic carbon material used in the preceding examples.

Ten milliliters of 96% sulfuric acid were added to 100 g of petroleum pitch, and sufficiently mixed in a mortar. The mixture was then heated in an argon atmosphere to 1000° C. at a rate of 100° C./hour and kept for 10 hours holding the 1000° C. temperature. The mixture was further heated to 3000° C. at a rate of 50° C./hour and kept for 20 hours holding the 3000° C. temperature, thus obtaining a carbon material. Hereinafter, the carbon material obtained in this example is referred to as "ACID-C5".

In order to examine the properties of the thus-prepared carbon material as an electrode, a test battery as shown in FIG. 1 was manufactured in the manner as described in Example 1. The test battery was then subjected to repeated cycles of cathodic polarization and anodic polarization under the same conditions as in Example 1.

As a comparative example, a control electrode (hereinafter referred to as a "C1" electrode) was prepared in the same manner as the ACID-C5 electrode except that sulfuric acid was not added to the petroleum pitch in this comparative example. Then, a test battery was manufactured using the C1 electrode in the manner as described in Example 1, and the test battery was subjected to repeated cycles of cathodic polarization and anodic polarization under the same conditions as described in Example 1.

Table 5 shows the charge capacitance and the discharge capacitance for each of the ACID-C5 electrode and the C1 electrode at the first cycle and the eleventh cycle of the cathodic polarization and the anodic polarization. The voltages of the two test batteries at each polarization were substantially the same.

TABLE 5

| | First cycle | | Eleventh cycle | |
| --- | --- | --- | --- | --- |
| | Charge capacitance mAh/g | Discharge capacitance mAh/g | Charge capacitance mAh/g | Discharge capacitance mAh/g |
| ACID-C5 Electrode | 370 | 350 | 350 | 350 |
| C1 Electrode (Comparative example) | 300 | 250 | 250 | 250 |

As is seen from Table 5, both the charge and discharge capacitances for the ACID-C5 of this example are greater than those for the C1 electrode. Especially, the discharge capacitance is kept unchanged after eleven cycles, indicating that the battery using the ACID-C5 electrode of this example can retain a large discharge capacitance. The table also shows that the difference between the charge capacitance and the discharge capacitance, i.e., the amount of Li which was absorbed into the carbon material at charging but has not been released therefrom at discharging in the initial cycle, is small in the ACID-C5 electrode compared with the C1 electrode.

The test batteries were disassembled after the completion of the cathodic polarization in the eleventh cycle. As a result, no deposition of Li metal was observed for either the ACID-C5 electrode or the C1 electrode, and Li was found stored in both electrodes by visual observation. This indicates that the Li had been absorbed into the ACID-C5 electrode during the cathodic polarization.

The same effects as described above can be obtained when other organic materials such as pitch, coal tar, a mixture of coke and pitch, wooden material, a furan resin, cellulose, polyacrylonitrile, and rayon are used in place of the petroleum pitch.

Example 7

Sulfuric acid, nitric acid, hydrochloric acid, boric acid, and formic acid were respectively added to petroleum pitch to form negative electrodes. The resultant negative electrodes were tested to compare the capacitances and the properties thereof.

Ten milliliters of each of 1.0N sulfuric acid, nitric acid, hydrochloric acid, boric acid, and formic acid were added to 100 g of petroleum pitch, and sufficiently mixed in a mortar. These five mixtures were then heated in an argon atmosphere to 1000° C. at a rate of 100° C./hour and kept for 10 hours holding the 1000° C. temperature. The mixtures were further heated to 3000° C. at a rate of 50° C./hour and kept for 20 hours holding the 3000° C. temperature, thus obtaining carbon materials.

In order to examine the properties of the thus-prepared carbon materials as an electrode, test batteries as shown in FIG. 1 were manufactured for respective carbon materials in the manner as described in Example 1. The test batteries were then subjected to repeated cycles of cathodic polarization and anodic polarization under the same conditions as in Example 1.

As a comparative example, the battery using the C1 electrode described in Example 6 was also used in this example.

Table 6 shows the charge capacitance and the discharge capacitance for each electrode at the eleventh cycle of the cathodic polarization and the anodic polarization.

TABLE 6

| Acid added | Eleventh cycle charge capacitance (mAh/g) | Eleventh cycle discharge capacitance (mAh/g) |
| --- | --- | --- |
| Sulfuric acid | 370 | 350 |
| Nitric acid | 360 | 340 |
| Hydrochloric acid | 330 | 310 |
| Boric acid | 340 | 320 |
| Formic acid | 320 | 300 |
| No acid | | |

TABLE 6-continued

| Acid added | Eleventh cycle charge capacitance (mAh/g) | Eleventh cycle discharge capacitance (mAh/g) |
| --- | --- | --- |
| (comparative example) | 300 | 250 |

As is seen from Table 6, both the charge capacitance and the discharge capacitances for each electrode obtained in this example are greater than those for the C1 electrode. The table also shows that the difference between the charge capacitance and the discharge capacitance, i.e., the amount of Li which was absorbed into the carbon material at charging but had not been released therefrom at discharging in the initial cycle, was small in the electrodes of this example compared with the C1 electrode.

When the electrodes obtained in this example were immersed in pure water, the pH of the resultant leaching solutions were all neutral.

Two or more of the above acids can be added to the petroleum pitch to obtain an electrode in which the charge and discharge capacitances are large and the difference therebetween is small compared with the C1 electrode.

Example 8

In this example, the temperature for heating the mixture of the petroleum pitch and the acid to obtain the carbon material was examined.

Ten milliliters of 1.0N sulfuric acid were added to 100 g of petroleum pitch, and sufficiently mixed in a mortar. Eight identical samples of such a mixture were prepared and heated in an argon atmosphere at different temperatures of 400° C., 600° C., 800° C., 1000° C., 1500° C., 2000° C., 2500° C., and 3000° C. for 10 hours.

In order to examine the properties of the thus-prepared carbon materials as an electrode, test batteries as shown in FIG. 1 were manufactured for the respective carbon materials in the manner as described in Example 1. The test batteries were then subjected to repeated cycles of cathodic polarization and anodic polarization under the same conditions as in Example 1.

Table 7 shows the charge capacitance and the discharge capacitance for the electrode at the first cycle and the eleventh cycle of the cathodic polarization and the anodic polarization.

TABLE 7

| | First cycle | | Eleventh cycle | |
| --- | --- | --- | --- | --- |
| Heating temperature | Charge capacitance mAh/g | Discharge capacitance mAh/g | Charge capacitance mAh/g | Discharge capacitance mAh/g |
| 400° C. | 250 | 210 | 180 | 170 |
| 600° C. | 320 | 300 | 300 | 300 |
| 800° C. | 330 | 310 | 310 | 310 |
| 1000° C. | 340 | 320 | 320 | 320 |
| 1500° C. | 345 | 325 | 325 | 325 |
| 2000° C. | 350 | 330 | 330 | 330 |
| 2500° C. | 360 | 340 | 340 | 340 |
| 3000° C. | 370 | 350 | 350 | 350 |

As is seen from Table 7, with the increase in the heating temperature, both the charge and discharge capacitances increase. The increase in the capacitance is particularly significant in the comparatively low temperature range of 600° C. to 1500° C., compared with the carbon material obtained without an addition of acid.

Example 9

Figure 3:
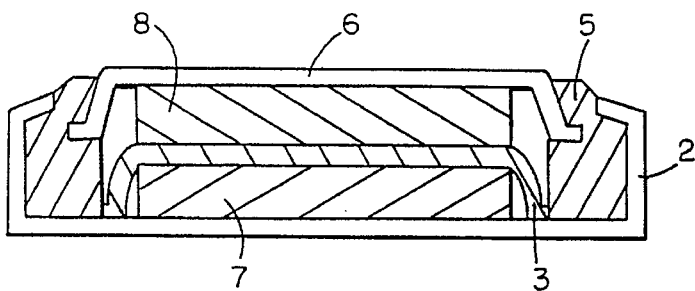
FIG. 3 is a schematic sectional view showing a coin-shaped battery using the negative electrode according to the present invention.

In this example, a coin-shaped test battery as shown in FIG. 3 was manufactured using the negative electrode according to the present invention, and the properties of the negative electrode were examined.

A hundred grams of $LiMn_2O_4$ as a positive electrode active material, 5 g of acetylene black as a conducting agent, and 5 g of polytetrafluoroethylene as a binder were mixed, and 1 g of the mixture was pressed to form a disk-shaped positive electrode 7 having a diameter of 17.5 mm as shown in FIG. 3.

Ten milliliters of 1N sulfuric acid were added to 100 g of petroleum pitch, and sufficiently mixed in a mortar. The mixture was then heated in an argon atmosphere to 1000° C. at a rate of 100° C./hour and kept for 10 hours holding the 1000° C. temperature. The mixture was further heated to 3000° C. at a rate of 50° C./hour and kept for 20 hours holding the 3000° C. temperature, thus obtaining a carbon material. Ten grams of the carbon material were mixed with 1 g of polyethylene powder, and 0.1 g of the mixture was pressed to form a disk-shaped negative electrode 8 having a diameter of 17.5 mm.

The positive electrode 7 was placed in a case 2 as shown in FIG. 3, and covered with a separator 3 made of microporous polypropylene. Then, a mixture of ethylene carbonate (EC) and dimethoxyethane (DME) at a volume ratio of 1:1 containing lithium trifluoromethanesulfonate ($LiCF_3SO_3$) at 1 mol/liter was prepared as a nonaqueous electrolyte, and poured over the separator 3. Thereafter, the negative electrode 8 was placed on the separator 3, and covered with a closing plate 6 provided with a polypropylene gasket 5 on the periphery thereof to close the case 2 and thus to complete the coin-shaped test battery.

As a comparative example, a control electrode was prepared in the same manner as the above negative electrode 8 except that sulfuric acid was not added to the petroleum pitch in this comparative example. Then, a control battery was manufactured using this electrode in the manner as described above.

The capacitance of the positive electrode is greater than that of the negative electrode in both the test battery and the control battery. Accordingly, the capacitance of each battery is determined by the capacitance of the negative electrode.

Figure 4:
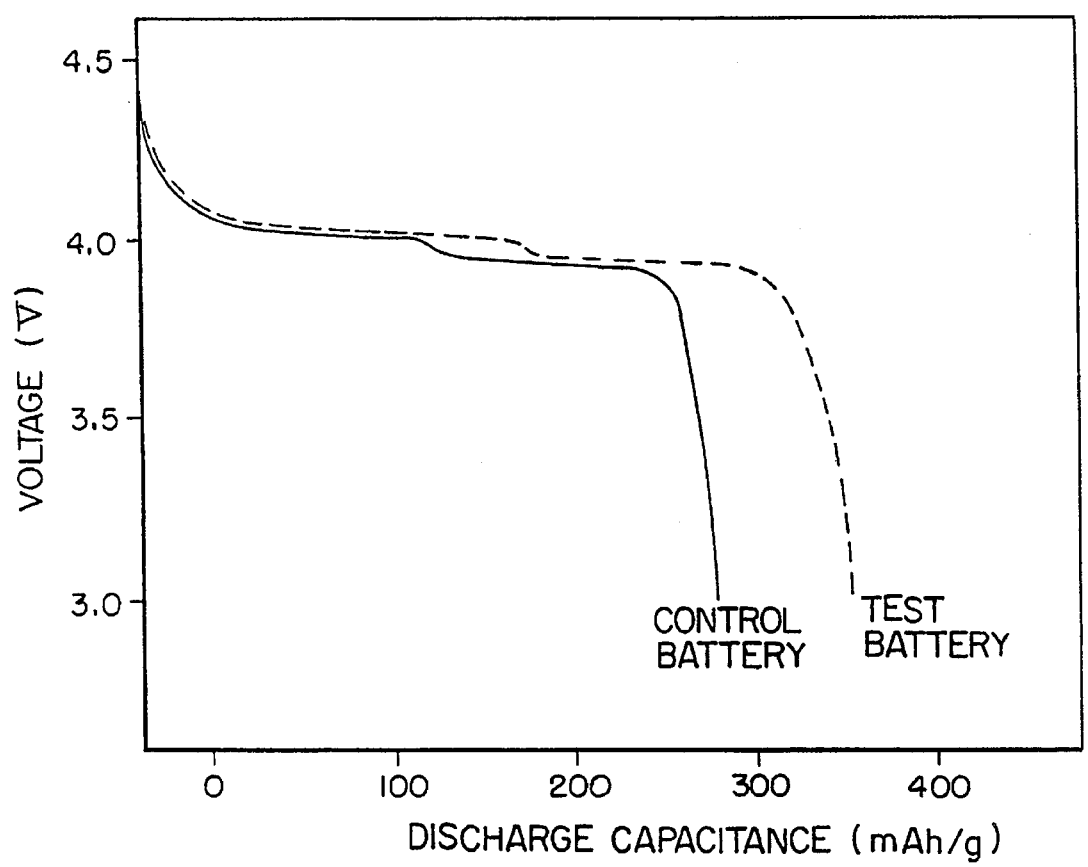
FIG. 4 shows a discharge curve of the battery of FIG. 3 using the negative electrode according to the present invention.

Both batteries were charged to 4.4 V at a constant current of 2 mA and then discharged to 3 V. This cycle of charging and discharging was repeated. FIG. 4 shows discharge curves of the test battery (shown by dashed lines) and the control battery (shown by solid lines) at the eleventh cycle. The x-axis shows a discharge capacitance per 1 g of the negative electrode active material. As shown in FIG. 4, while the discharge voltages of both batteries are substantially the same, the capacitance of the test battery is significantly large compared with that of the comparative battery.

The batteries were disassembled after the completion of the charging in the fiftieth cycle. As a result, no deposition of Li metal was observed in either batteries.

Substantially the same effects were obtained when $LiCoO_2$ and $LiNiO_2$ were used in place of $LiMn_2O_4$ for a positive electrode active material.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A process for producing a negative electrode for a storage battery including a positive electrode, a non-aqueous electrolyte containing lithium salt, and a negative electrode, the process comprising the steps of adding an acid to an inorganic carbon-containing material to from a mixture, heating the mixture for at least 10 hours at a heating temperature to obtain a carbon material having a specific surface area of more than 8.0 $m^2/g$, and forming the negative electrode by use of the carbon material, wherein the acid is selected from the group consisting of acetic acid, boric acid, hydrochloric acid, nitric acid and sulfuric acid.

2. A process according to claim 1, wherein the heating temperature is in the range of 400° C. to 3000° C.

3. A process according to claim 1, wherein the inorganic carbon material is graphite, carbon fiber, or a graphite whisker.

4. A process according to claim 1, wherein the heating temperature is in the range of 100° C. to 1500° C.

5. A process for producing a negative electrode for a storage battery including a positive electrode reversibly charged and discharged and comprised of $LiMn_2O_4$, $LiCoO_2$ or $LiNiO_2$, a non-aqueous electrolyte containing lithium salt, and a negative electrode, the process comprising the steps of adding an acid to an inorganic carbon-containing material to form a mixture, wherein the acid is at least one of acetic acid, boric acid, hydrochloric acid, nitric acid or sulfuric acid; heating the mixture for at least 10 hours at a heating temperature to obtain a carbon material having a specific surface area of more than 8.0 $m^2/g$; and forming the negative electrode by use of the carbon material.

6. A process for producing a negative electrode for a storage battery including a positive electrode, a non-aqueous electrolyte containing lithium salt, and a negative electrode, the process comprising the steps of adding an acid to an inorganic carbon-containing material to form a mixture, heating the mixture for at least 10 hours at a heating temperature to obtain a carbon material having a specific surface area of mere than 8.0 $m^2/g$, and forming the negative electrode by use of the carbon material, wherein the acid is selected from the group consisting of acetic acid, boric acid, hydrochloric acid, nitric acid and sulfuric acid and wherein the mixture is substantially free of phosphorus.

* * * * *